(12) United States Patent
Chen et al.

(10) Patent No.: US 8,481,917 B2
(45) Date of Patent: Jul. 9, 2013

(54) SYSTEM AND METHOD FOR CALIBRATING AN AMBIENT LIGHT SENSOR

(75) Inventors: Li-Mei Chen, Shanghai (CN); Ming-Fu Chen, Jhongli (TW); Yi-Hsun Lin, Jhongli (TW)

(73) Assignees: Amlink (Shanghai) Ltd., Shanghai (CN); Ampower Technology Co., Ltd., Jhongli, Taoyuan County (TW)

( * ) Notice: Subject to any disclaimer, the term of this patent is extended or adjusted under 35 U.S.C. 154(b) by 874 days.

(21) Appl. No.: 12/612,012

(22) Filed: Nov. 4, 2009

(65) Prior Publication Data

US 2010/0224771 A1    Sep. 9, 2010

(30) Foreign Application Priority Data

Mar. 6, 2009  (CN) .......................... 2009 1 0106021

(51) Int. Cl.
G01D 18/00 (2006.01)
G01J 5/00 (2006.01)
G06F 5/02 (2006.01)

(52) U.S. Cl.
USPC ........................ 250/252.1; 250/349; 374/128

(58) Field of Classification Search
USPC ................. 250/252.1, 349; 374/128; 455/334
See application file for complete search history.

(56) References Cited

U.S. PATENT DOCUMENTS

| | | | | |
|---|---|---|---|---|
| 3,387,134 A * | 6/1968 | Treharne | ........................ | 250/349 |
| 3,444,739 A * | 5/1969 | Treharne | ........................ | 374/128 |
| 7,509,113 B2 * | 3/2009 | Knoedgen | ...................... | 455/334 |
| 2005/0055172 A1 * | 3/2005 | Flaherty | ........................ | 702/117 |

* cited by examiner

Primary Examiner — David Porta
Assistant Examiner — Faye Boosalis
(74) Attorney, Agent, or Firm — Altis Law Group, Inc.

(57) ABSTRACT

A system and a method for calibrating an ambient light sensor (ALS) are disclosed. The ALS, an adjustable resistor and a switch are located on a first surface of a printed circuit board (PCB), and the adjustable resistor and the switch are connected in series between an adjustable probe of the ALS and the ground. A resistor is connected between two pads located on a second surface of the PCB via two probes touching the pads. A controller connected to the PCB reads a light sensitivity of the ALS and calculates a calculated resistance value of the adjustable resistor by a formula "detected light sensitivity/resistance value of the resistor=objective light sensitivity/resistance value of the adjustable resistor", wherein the objective light sensitivity and the resistance value of the resistor are given.

6 Claims, 4 Drawing Sheets

SYSTEM AND METHOD FOR CALIBRATING AN AMBIENT LIGHT SENSOR

BACKGROUND

1. Technical Field

The present disclosure relates to a system and a method for calibrating an ambient light sensor (ALS).

2. Description of Related Art

An ALS is used in display-equipped electronic devices, to measure available environmental light and automatically adjust display a backlight of the display-equipped electronic devices accordingly. Referring to FIG. 1, a commonly used ALS includes a calibration probe 52 and an adjustable resistor 54. The adjustable resistor 54 is connected between the calibration probe 52 and the ground 56 in series. Before installing the ALS in the electronic device, the light sensitivity of the ALS must be calibrated to a required value.

Therefore, it is desirable to provide a method and a system to calibrate the light sensitivity of an ALS.

DETAILED DESCRIPTION

Figure 1:
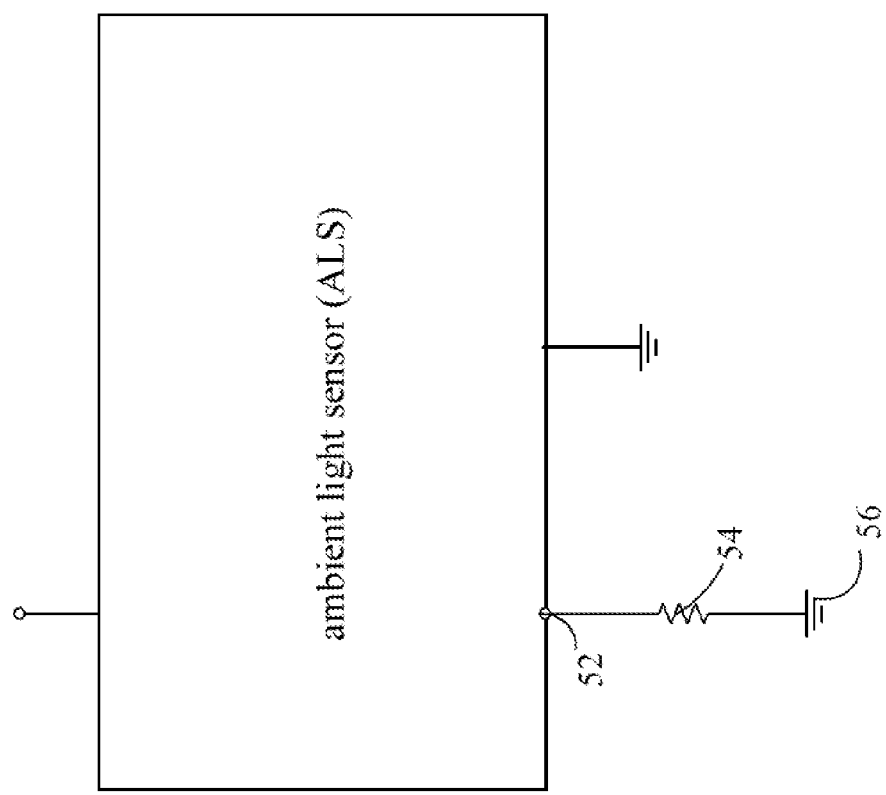
FIG. 1 is a schematic diagram of a commonly used ambient light sensor (ALS) with an adjustable resistor.
Figure 2:
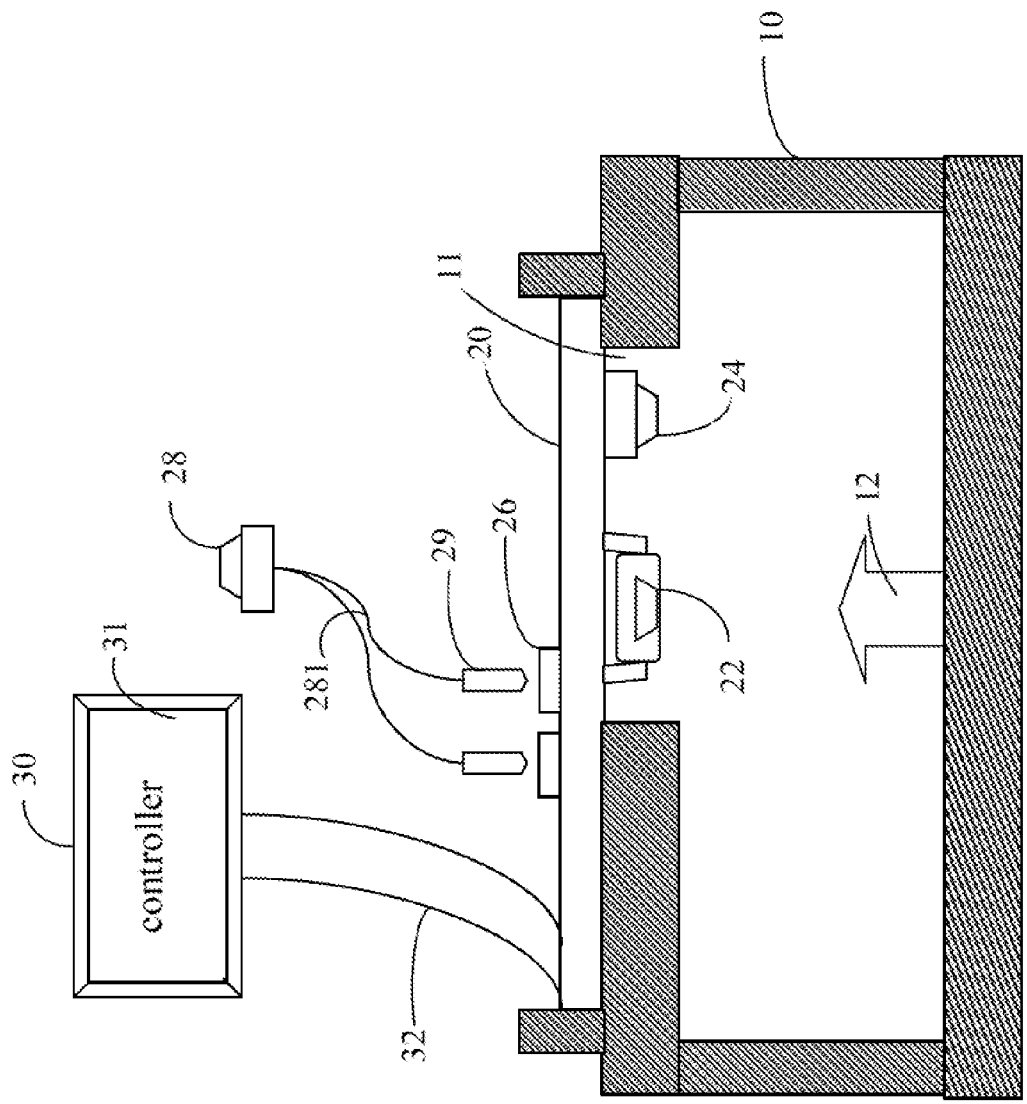
FIG. 2 is a schematic diagram of one embodiment of a system for calibrating an ALS in accordance with the present disclosure.
Figure 3:
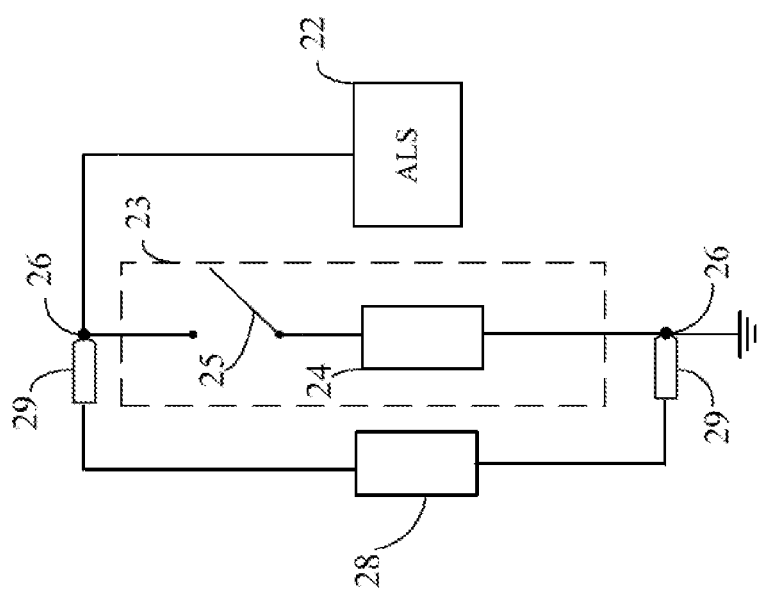
FIG. 3 is a circuit diagram of a system for calibrating an ALS, employed in a system, such as, for example, that of FIG. 2.

Referring to FIG. 2 and FIG. 3, a light sensitivity calibration system in accordance with the present disclosure used to calibrate an ambient light sensor (ALS) 22 includes a test box 10, a printed circuit board (PCB) 20, a resistor 28 and a visual controller 30. The test box 10 is used to calibrate light sensitivity of the ALS 22 via calibration of an adjustable resistor 24. The adjustable resistor 24 and the ALS 22 are located on a first surface of the PCB 20, and the adjustable resistor 24 and a switch 25 are connected between a calibration probe of the ALS 22 and the ground in series to constitute a series circuit 23. The PCB 20 includes two pads 26 located on a second surface thereof opposite to the first surface. The pads 26 are respectively connected to two ends of the series circuit 23 composed of the adjustable resistor 24 and the switch 25 via PCB traces.

The test box 10 is substantially hermetical and defines an opening 11 in one side wall. A light source 12 is configured on another inner wall of the test box 10 and faces the opening 11. Before the PCB 20 is attached to the test box 10, the switch 25 is turned off. Subsequently, the PCB 20 covers the opening 11 of the test box 10, with the adjustable resistor 24 and the ALS 22 accommodated in the opening 11 and facing to the light source 12. In this situation, the adjustable resistor 24 is not electrically connected to the ALS 22.

In this embodiment, two ends of the resistor 28 are connected to probes 29 via conducting wires 281, respectively. When calibrating, the probes 29 contact the two pads 26, respectively. The visual controller 30 electrically connects to the PCB 20 via cable 32 to measure and display the light sensitivity of the ALS 22.

In this exemplary embodiment, because the resistor 28 and the adjustable resistor 24 are connected to the ALS 22 in series for different times, the light sensitivity of the ALS 22 is individually and linearly influenced by the resistor 28 and the adjustable resistor 24. Therefore, a required resistance value of the adjustable resistor 24 can be calculated according to the following formula:

$$\text{detected light sensitivity/resistance value of the resistor 28} = \text{objective light sensitivity/required resistance value of the adjustable resistor 24} \quad (1)$$

In formula (1) above, the objective light sensitivity and the resistance value of the resistor 28 are expected or given, that is they are known. Based on formula (1), the controller 30 calculates and displays the required resistance of the adjustable resistor 24.

Figure 4:
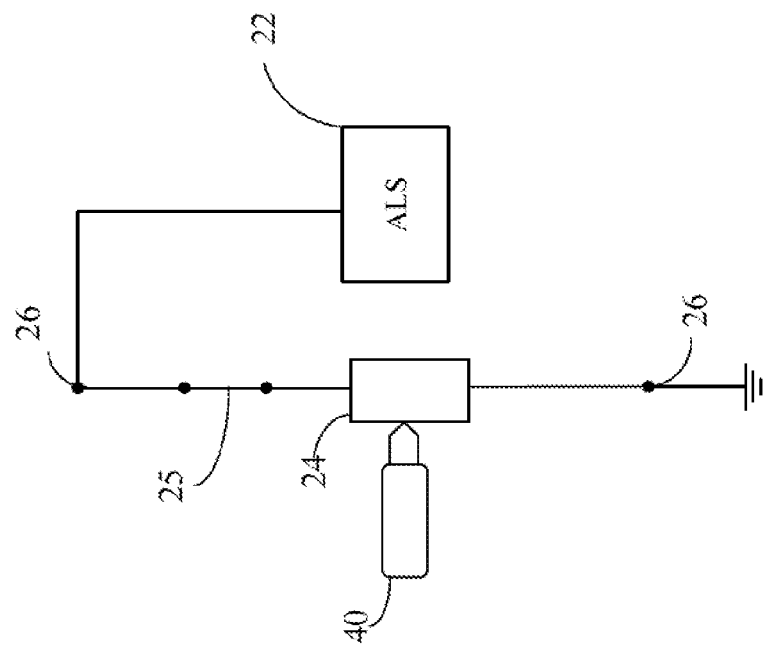
FIG. 4 is a circuit diagram showing calibration of an adjustable resistor of the ALS of FIG. 2.

After obtaining the required resistance of the adjustable resistor 24, the resistor 28 and the probes 29 are removed, and the PCB 20 is also removed from the test box 10. Subsequently, the switch 25 is turned on, and the resistance of the adjustable resistor 24 can be calibrated to the required resistance value by use of an adjustable rod 40, as shown in FIG. 4.

The test box 10 of the system for calibrating ALS of the disclosure has a simple structure. The required resistance value of the adjustable resistor 24 is received from the controller 30, and then the resistance value of the adjustable resistor 24 need simply be calibrated to the required resistance value in a single act, a simple and efficient operation.

While exemplary embodiments have been described, it should be understood that they have been presented by way of example only and not by way of limitation. The breadth and scope of the disclosure should not be limited by the described exemplary embodiments, but only in accordance with the following claims and their equivalents.

What is claimed is:

1. A light sensitivity calibration system for an ambient light sensor (ALS) located on a printed circuit board (PCB), the system comprising:

an adjustable resistor and a switch positioned on the PCB, the adjustable resistor and the switch connected between a calibration probe of the ALS and ground in series, wherein two pads of the PCB respectively connect to two ends of the adjustable resistor and the switch via PCB traces of the PCB;

a test box, defining an opening and comprising a light source therein, wherein after turning off the switch, the PCB is fixed on the test box with the adjustable resistor and the ALS is positioned in the opening and faces the light source;

a resistor, two ends of which respectively contact the two pads; and a visual controller, electrically connected to the PCB, to detect a light sensitivity of the ALS, and calculate and display a required resistance value of the adjustable resistor.

2. The system for calibrating ALS as claimed in claim 1, further comprising two probes, respectively connected to the two ends of the resistor and contacting the two pads.

3. The system as in claim 1, wherein the required resistance value of the adjustable resistor is calculated according to detected light sensitivity/resistance value of the resistor=objective light sensitivity/required resistance value of the adjustable resistor.

4. A method for calibrating light sensitivity of an ambient light sensor (ALS) located on a PCB, the PCB comprising an adjustable resistor and a switch connected between a calibration probe of the ALS and the ground in series, the PCB further comprising two pads respectively connected to two ends of the series circuit composed of the adjustable resistor and the switch via PCB traces of the PCB, the method comprising:
- turning off the switch and fixing the PCB on a test box with the adjustable resistor and the ALS enclosed by the test box and facing a light source located in the test box;
- electrically connecting two ends of an resistor to the two pads of the PCB, respectively;
- electrically connecting a visual controller to the PCB to detect a light sensitivity value of the ALS, and calculate and display a required resistance value of the adjustable resistor based on an objective light sensitivity and the resistor;
- removing the resistor from the PCB and turning on the switch; and
- calibrating the resistance value of the adjustable resistor to the required resistance value.

5. The method for calibrating ALS as claimed in claim 4, wherein the two ends of the resistor respectively connect to two probes, and the two probes respectively contact the two pads.

6. The method for calibrating ALS as claimed in claim 4, wherein the required resistance value of the adjustable resistor is arrived at according to a formula:

$$\text{detected light sensitivity/resistance value of the resistor} = \text{objective light sensitivity/required resistance value of the adjustable resistor.}$$

* * * * *